(12) United States Patent
Nakano et al.

(10) Patent No.: US 9,341,793 B2
(45) Date of Patent: May 17, 2016

(54) LIGHT SOURCE DEVICE

(71) Applicant: Mitsubishi Electric Corporation, Tokyo (JP)

(72) Inventors: Seiji Nakano, Tokyo (JP); Mitoru Yabe, Tokyo (JP); Keiji Nakamura, Tokyo (JP); Satoru Okagaki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 14/481,549

(22) Filed: Sep. 9, 2014

(65) Prior Publication Data
US 2015/0098241 A1    Apr. 9, 2015

(30) Foreign Application Priority Data
Oct. 9, 2013   (JP) .................. 2013-211749

(51) Int. Cl.
G02B 6/42    (2006.01)

(52) U.S. Cl.
CPC ............ *G02B 6/4263* (2013.01); *G02B 6/4204* (2013.01); *G02B 6/4225* (2013.01); *G02B 6/4239* (2013.01)

(58) Field of Classification Search
CPC .. G02B 6/4263; G02B 6/4204; G02B 6/4225; G02B 6/4239
See application file for complete search history.

(56) References Cited

U.S. PATENT DOCUMENTS

| 5,107,537 A | 4/1992 | Schriks et al. |
| 5,170,454 A * | 12/1992 | Kanai ............... G02B 6/32 362/574 |
| 5,949,939 A | 9/1999 | Kyoya |
| 2002/0168153 A1 | 11/2002 | Yamabayashi et al. |
| 2004/0114873 A1 * | 6/2004 | Alexeev ............ G02B 6/4226 385/52 |
| 2005/0121687 A1 * | 6/2005 | Yamada ............ G02B 6/4201 257/99 |
| 2005/0175300 A1 * | 8/2005 | Tanaka ............. G02B 3/0087 385/93 |

FOREIGN PATENT DOCUMENTS

| JP | 2-32583 A | 2/1990 |
| WO | WO 92/20171 | 11/1992 |

* cited by examiner

*Primary Examiner* — Mary Ellen Bowman
(74) *Attorney, Agent, or Firm* — Birch, Stewart, Kolasch & Birch, LLP

(57) ABSTRACT

Provided is a light source device which includes: a LD mounted on a stem; a cap fixed to the stem so as to cover the LD; a light converging lens capable of converging light flux emitted from the LD; an optical fiber connection portion to which an optical fiber is connected, the optical fiber receiving inputting of the light flux converged by the light converging lens; and a holder for holding the optical fiber connection portion, the holder being fixed to the cap. The optical fiber connection portion includes a position adjusting portion which adjusts a position of the optical fiber connection portion with respect to the holder.

7 Claims, 14 Drawing Sheets

F I G. 1 3
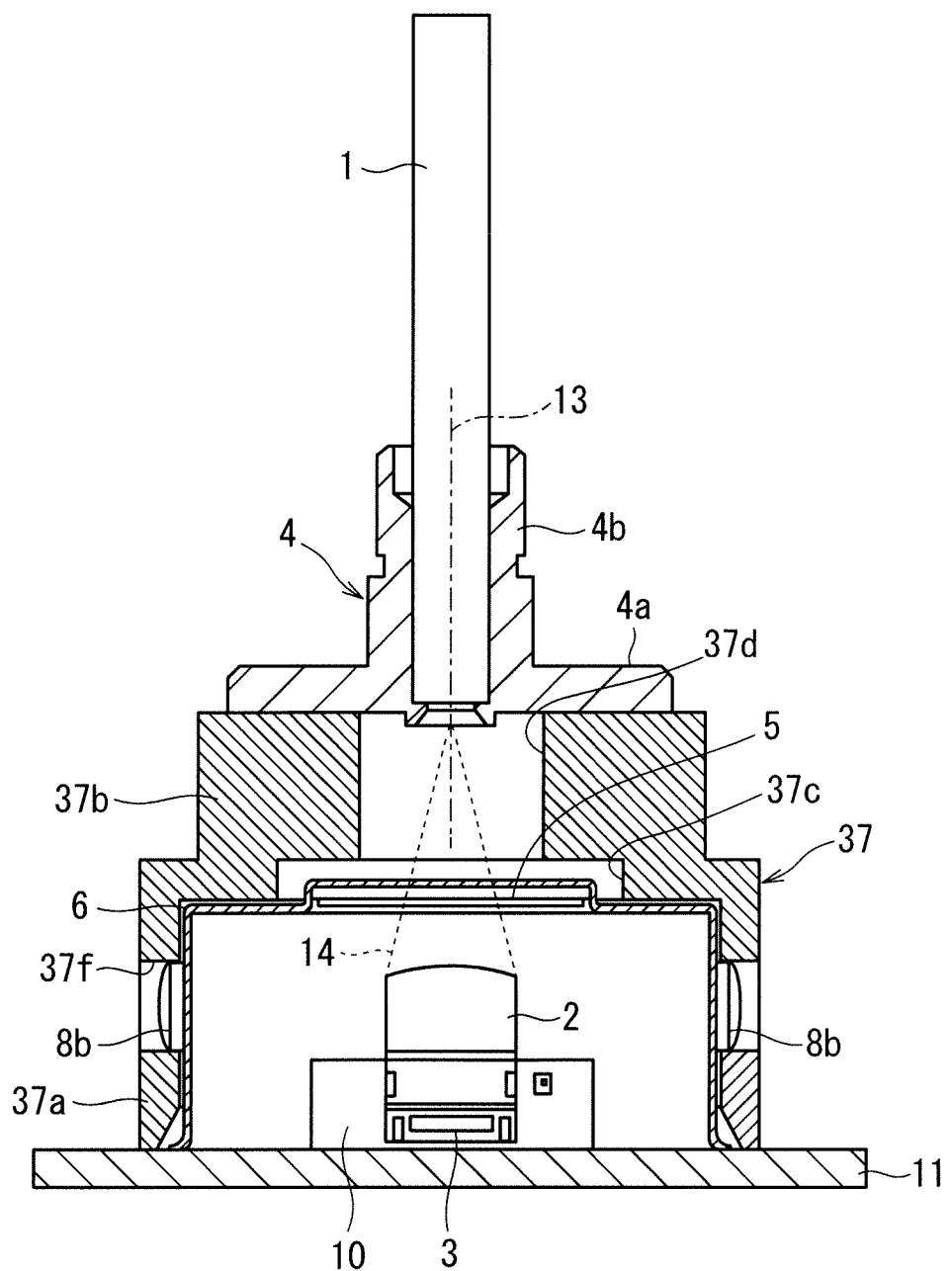

LIGHT SOURCE DEVICE

BACKGROUND OF THE INVENTION

1. Field of the Invention

The present invention relates to a light source device which converges light flux emitted from a light source on an optical fiber.

2. Description of the Background Art

As a conventional light source device which converges light flux emitted from a light source on an optical fiber, there has been known a light source device where a light converging lens and a ferrule holder are held by a holder. In such a light source device, the positional adjustment of the holder is performed in a state where the holder is brought into close contact with a stem to which an optical semiconductor element and a cap are fixed and, thereafter, the holder and the stem are fixed to each other by soldering (see Japanese Patent Application Laid-Open No. 2-32583, for example).

In a conventional light source device used for optical communication, the holder and the stem are fixed to each other by soldering or the like using the above-mentioned method and hence, a space for adjustment is required between the holder and a cap. Accordingly, the conventional light source has a drawback that the structure of the holder becomes complicated and the light source device becomes large-sized.

Further, it is necessary to fix the holder and the stem to each other by soldering or the like in a state where the positions of the holder and the stem are adjusted with high accuracy. Accordingly, there exist the following drawbacks. That is, when these constitutional members are heated and cooled at the time of performing fixing them by soldering, the constitutional members are thermally expanded and shrunken and a tension is generated in a soldered portion. Due to such thermal expansion or shrinkage of the constitutional members or the tension in the soldered portion, after fixing by soldering, the stem is positionally displaced from an optimum position by an order of micron thus giving rise to a drawback that a bonding efficiency is lowered exceeding an allowable level. Further, the conventional light source also has a drawback that the position adjustment operation of the holder with respect to the stem is difficult.

SUMMARY OF THE INVENTION

Provided is a technique by which the structure of a holder of a light source device can be simplified compared to prior art, the light source device can be miniaturized, and an adjustment operation for converging light flux emitted from a light source on an optical fiber can be performed easily.

The light source device according to the present invention includes: an optical semiconductor element which is mounted on a support base; a cap which is fixed to the support base so as to cover the optical semiconductor element; a light converging portion which converges light flux emitted from the optical semiconductor element; an optical fiber connection portion to which an optical fiber is connected, the optical fiber receiving inputting of the light flux converged by the light converging portion; and a holder which holds the optical fiber connection portion, the holder being fixed to the cap. The optical fiber connection portion includes a position adjusting portion which adjusts a position of the optical fiber connection portion with respect to the holder.

The optical fiber connection portion includes the position adjusting portion which adjusts the position of the optical fiber connection portion with respect to the holder. Accordingly, it is unnecessary to form a space for adjustment between the holder and the cap, and the holder can have the simplified structure so that the light source device can be miniaturized.

Further, the position of the optical fiber connection portion with respect to the holder can be adjusted using the position adjusting portion and hence, an adjustment operation for converging light flux emitted from a light source on an optical fiber can be performed easily.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is an X-Z cross-sectional view in FIG. 10; and

DESCRIPTION OF THE PREFERRED EMBODIMENTS

<First Preferred Embodiment>

Figure 1:
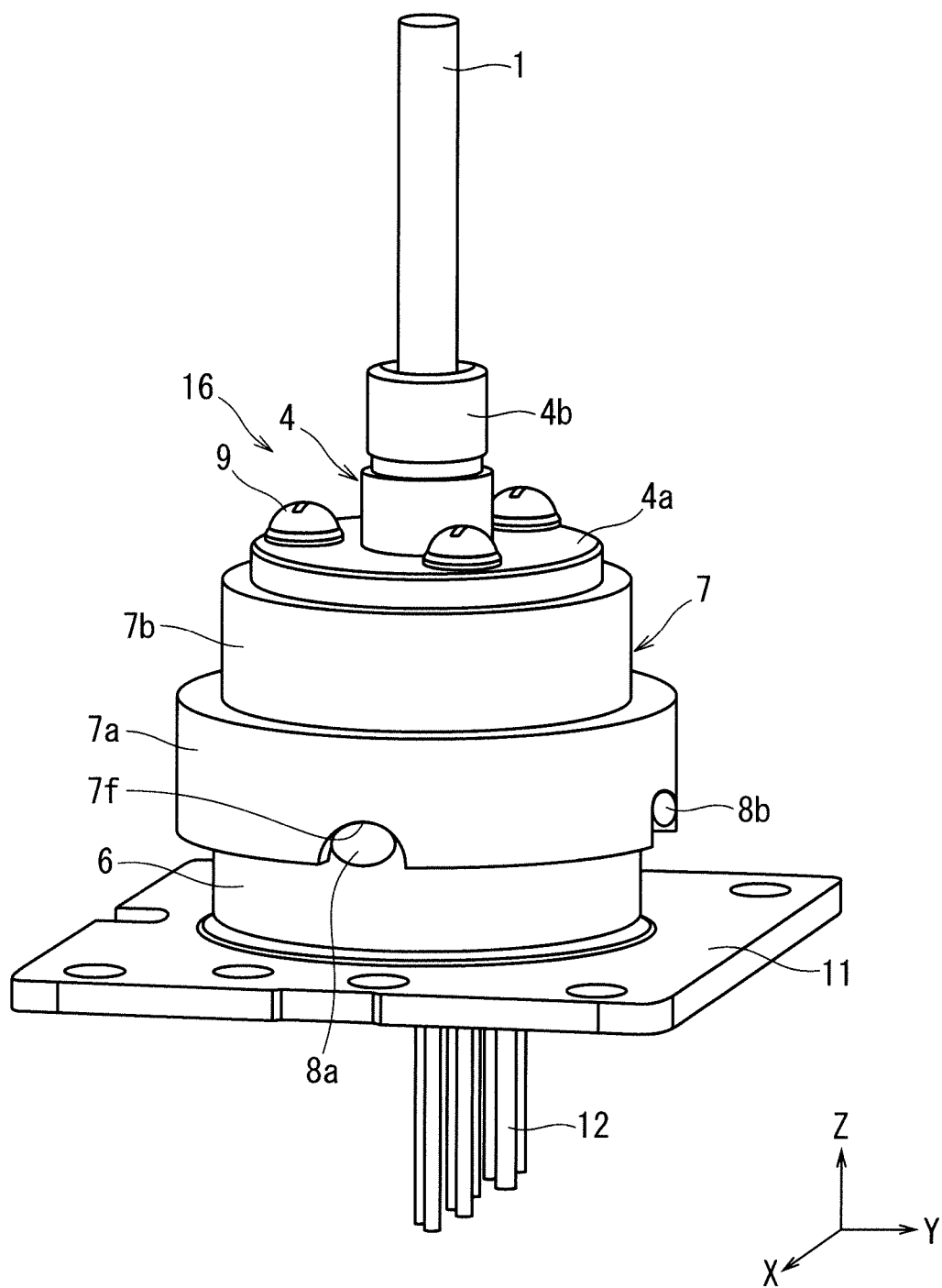
FIG. 1 is a perspective view of a light source device according to a first preferred embodiment.
Figure 2:
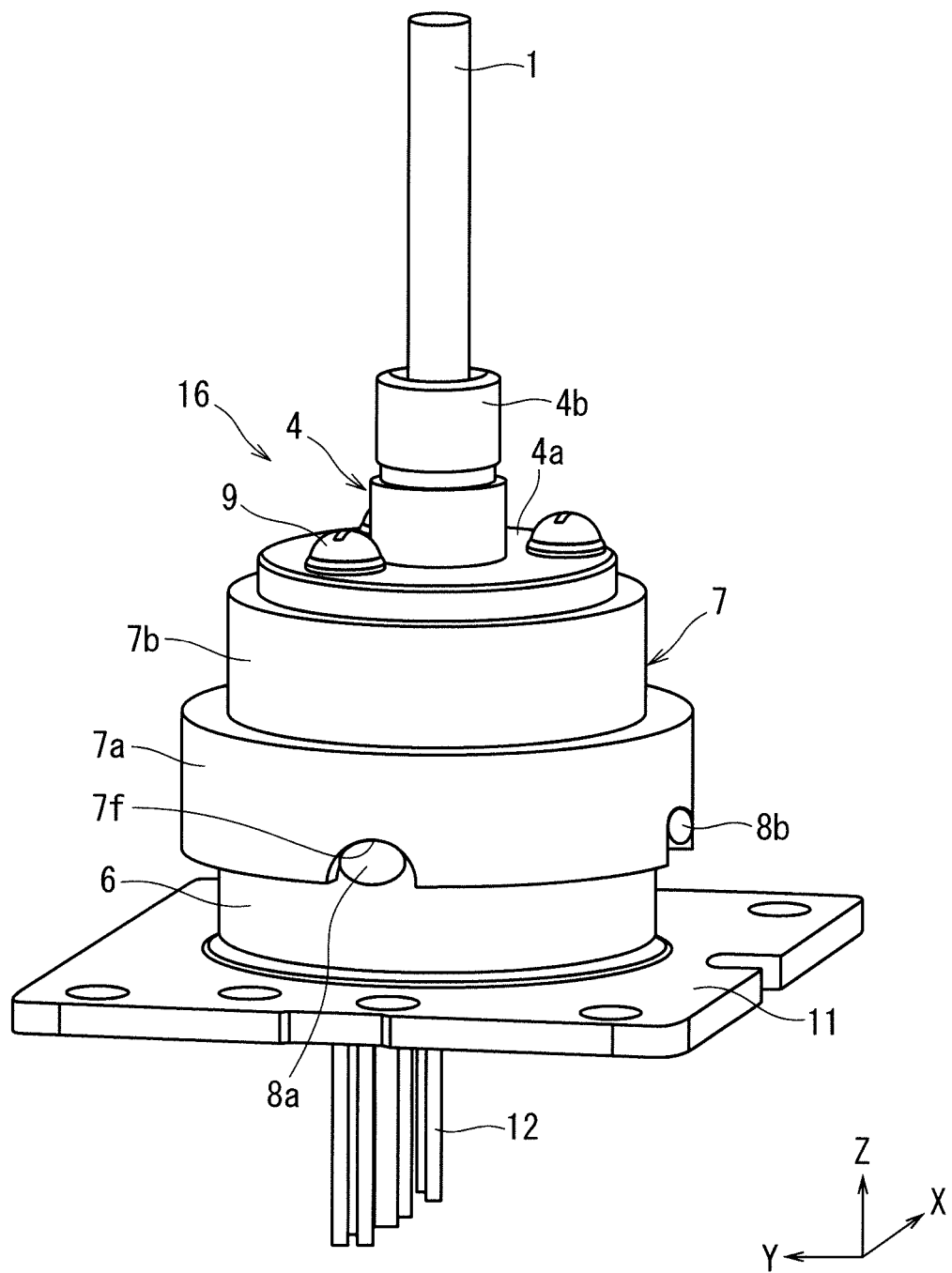
FIG. 2 is a perspective view of the light source device according to the first preferred embodiment as viewed from a different direction.
Figure 3:
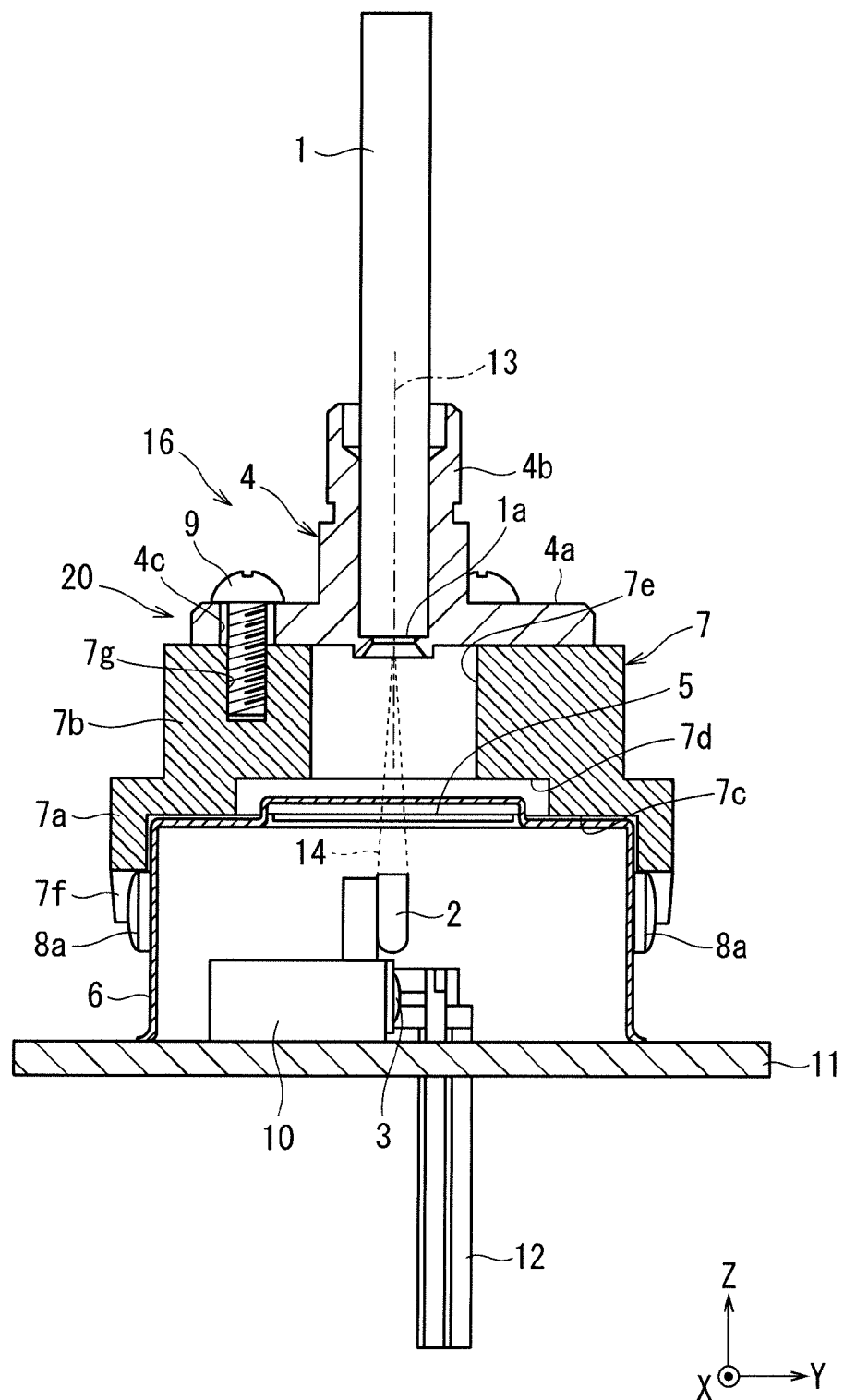
FIG. 3 is a Y-Z cross-sectional view in FIG. 1.
Figure 4:
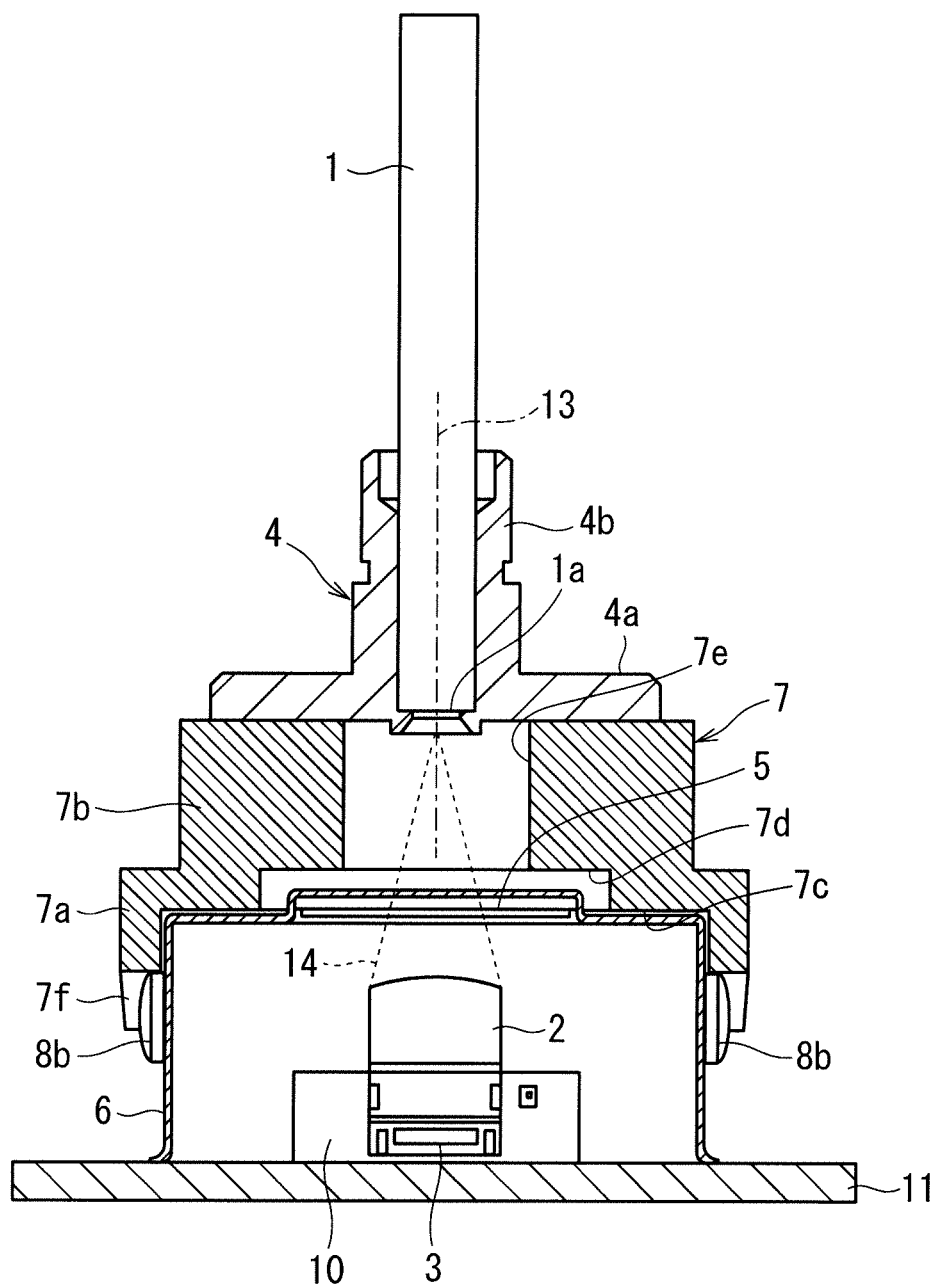
FIG. 4 is an X-Z cross-sectional view in FIG. 1.
Figure 5:
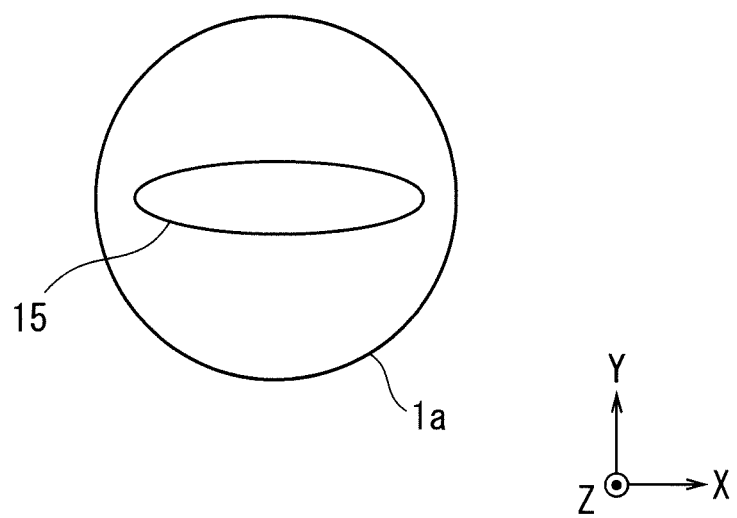
FIG. 5 is an explanatory view of a shape of a light spot converged on an optical fiber of the light source device according to the first preferred embodiment.

Hereinafter, a first preferred embodiment of the present invention is described by reference to drawings. FIG. 1 is a perspective view of a light source device according to the first preferred embodiment, FIG. 2 is a perspective view of the light source device as viewed from a different direction, FIG. 3 is a Y-Z cross-sectional view in FIG. 1, FIG. 4 is an X-Z cross-sectional view in FIG. 1, and FIG. 5 is an explanatory view of a shape of a light spot 15 converged on an optical fiber 1 of the light source device.

As shown in FIG. 1 to FIG. 4, the light source device includes: a stem 11 (support base); a block 10; a laser diode (hereinafter referred to as "LD") 3 which constitutes an optical semiconductor element; a cap 6; a light converging lens 2 (light converging portion); an optical fiber 1; an optical fiber connection portion 16; and a holder 7.

The stem 11 is a plate-shaped member for supporting the cap 6 and the block 10, and Au plating is applied to a surface of the stem 11. The block 10 is arranged on an upper surface of the stem 11, and supports the light converging lens 2 and the LD 3 thereon. The LD 3 is a multi-emitter laser diode, and is mounted on the stem 11. To be more specific, the LD 3 is mounted on a side portion of the block 10 arranged on the stem 11. A pin 12 for supplying electricity to the LD 3 is connected to the LD 3 from the outside of the light source device.

The light converging lens 2 is mounted on the block 10 at a position above the LD 3, and converges light flux emitted from the LD 3 on the optical fiber 1. The cap 6 is made of an Fe—Ni alloy and is formed into a cylindrical shape. Ni plating is applied to a surface of the cap 6. The cap 6 is fixed to the upper surface of the stem 11 so as to cover the light converging lens 2 and the LD 3 mounted on the block 10. A lower end portion of the cap 6 is bonded to the upper surface of the stem 11 by projection welding so that the inside of the cap 6 is airtightly sealed. A glass window 5 which allows light emitted from the LD 3 to pass therethrough is arranged at a center portion of an upper surface of the cap 6.

Next, the holder 7 is described. The holder 7 is a member for holding the optical fiber connection portion 16, and is bonded to a side surface portion of the cap 6. The holder 7 includes a large-diameter cylindrical portion 7a and a small-diameter cylindrical portion 7b arranged on an upper side of the large-diameter cylindrical portion 7a. A housing portion 7c for housing an upper portion of the cap 6 is formed in an inner portion of a lower portion of the large-diameter cylindrical portion 7a, and a housing portion 7d for housing the glass window 5 is formed in an inner portion of an upper portion of the large-diameter cylindrical portion 7a. The housing portion 7c and the housing portion 7d communicate with each other, and the housing portion 7c has a larger diameter than the housing portion 7d. A hole portion 7e which communicates with the housing portion 7d is formed at a center portion of the small-diameter cylindrical portion 7b.

The optical fiber connection portion 16 includes a receptacle 4 and a position adjusting portion 20 for adjusting a position of the optical fiber connection portion 16 with respect to the holder 7. The receptacle 4 includes a disk portion 4a which is screw-fixed to the holder 7 using screws 9 and a connection portion 4b to which the optical fiber 1 is connected. The connection portion 4b is arranged at a center portion of the disk portion 4a. The detail of the position adjusting portion 20 is described later.

In the inside of the cap 6, divergent light is emitted from the LD 3 mounted on the block 10, and the divergent light is converged by the light converging lens 2 mounted on the block 10. As indicated by an optical path 14 in FIG. 3 and FIG. 4, light flux which is converged by the light converging lens 2 passes through the glass window 5 arranged in the cap 6 and, thereafter, is converged on an end surface 1a of the optical fiber 1.

A plurality of (four, for example) cut-away portions 7f to which adhesive agents 8a, 8b are applied are formed on a lower end portion of the large-diameter cylindrical portion 7a. The adhesive agents 8a, 8b are members for adhesively fixing (bonding) the holder 7 and the cap 6 to each other. The adhesive agent 8a is an adhesive agent whose Young's modulus after curing is larger than Young's modulus of the adhesive agent 8b after curing.

By adhesively fixing the holder 7 to the cap 6, it is possible to acquire highly-reliable adhesive strength compared to the case where the holder 7 is adhered to the stem 11 to which Au plating is applied. In this preferred embodiment, the LD 3 is a multi-emitter-type laser diode and hence, the light spot 15 which is converged on the end surface 1a of the optical fiber 1 has a shape shown in FIG. 5. Accordingly, transmissivity of the optical fiber 1 is easily changed in the longitudinal direction of the light spot 15, and transmissivity of the optical fiber 1 is hardly changed in the lateral direction of the light spot 15.

The cut-away portions 7f are arranged at positions which are in line symmetry with respect to the center of an optical axis 13 of light flux emitted from the LD 3. In other words, the adhesive agents 8a, 8b are arranged at positions which are in line symmetry with respect to the center of the optical axis 13 of the light flux emitted from the LD 3. The adhesive agent 8a is applied to the cut-away portions 7f in the longitudinal direction of the light spot 15. The adhesive agent 8a has larger Young's modulus after curing than Young's modulus of the adhesive agent 8b after curing and hence, a positional displacement of the holder 7 due to the adhesive agent 8a hardly occurs so that a positional displacement of the light spot 15 on the optical fiber 1 becomes small. Accordingly, it is possible to realize a highly reliable light source device.

Further, the adhesive agent 8b having smaller Young's modulus after curing than the adhesive agent 8a is applied to the cut-away portions 7f in the lateral direction of the light spot 15. The adhesive agent 8b has a predetermined flexibility and hence, even when a heat cycle or the like is applied to the adhesive agent 8b, there is no possibility that the adhesive agent 8b ruptures whereby it is possible to acquire a reliable adhesive strength.

Next, the position adjusting portion 20 which adjusts a position of the optical fiber connection portion 16 (to be more specific, receptacle 4) with respect to the holder 7 is described. The position adjusting portion 20 includes the screws 9 and large-diameter holes 4c, and is configured such that the screws 9 are loosely fitted in the receptacle 4 with a play.

The small-diameter cylindrical portion 7b of the holder 7 and the disk portion 4a of the receptacle 4 are fixed to each other using the plurality of (three, for example) screws 9. A plurality of (three, for example) screw holes 7g are formed in an outer peripheral portion of the small-diameter cylindrical portion 7b, and a plurality of (three, for example) large-diameter holes 4c having a larger diameter than the screw holes 7g (in other words, a larger diameter than the shaft portion of the screw 9) are formed in an outer peripheral portion of the disk portion 4a. A predetermined gap is formed between the large-diameter hole 4c and the shaft portion of the screw 9 in a state where the screw 9 is inserted into the large-diameter hole 4c. Due to such a gap, the receptacle 4 is movable in the horizontal direction by an amount corresponding to the gap between the diameter of the large-diameter hole 4c and the diameter of the shaft portion of the screw 9.

Next, a method of adjusting a position of the receptacle 4 using the position adjusting portion 20 is described. Firstly, positions of the large-diameter holes 4c formed in the disk portions 4a are aligned to the screw holes 7g formed in the small-diameter cylindrical portions 7b and, in such a state, the screws 9 are fastened to the screw holes 7g halfway through the large-diameter holes 4c. In such a state, head portions of the screws 9 are not brought into contact with the upper surface of the disk portion 4a and hence, the position of the receptacle 4 with respect to the holder 7 can be adjusted by merely moving the receptacle 4 in the horizontal direction by an amount corresponding to the gap between the diameter of the large-diameter hole 4c and the diameter of the shaft portion of the screw 9.

The light converging lens 2 is fixed to the block 10 with high accuracy using an adhesive agent such that light is converged on a predetermined target. Accordingly, a desired transmissivity can be acquired by merely performing the position adjustment of the receptacle 4 with respect to the holder 7. After the position adjustment of the receptacle 4 is performed, the screws 9 are fully fastened to the screw holes 7g. In such a state, the head portions of the screws 9 are brought in contact with the upper surface of the disk portion 4a and hence, the receptacle 4 is not movable in the horizontal direction. That is, the receptacle 4 is fixed to the holder 7.

Figure 14:
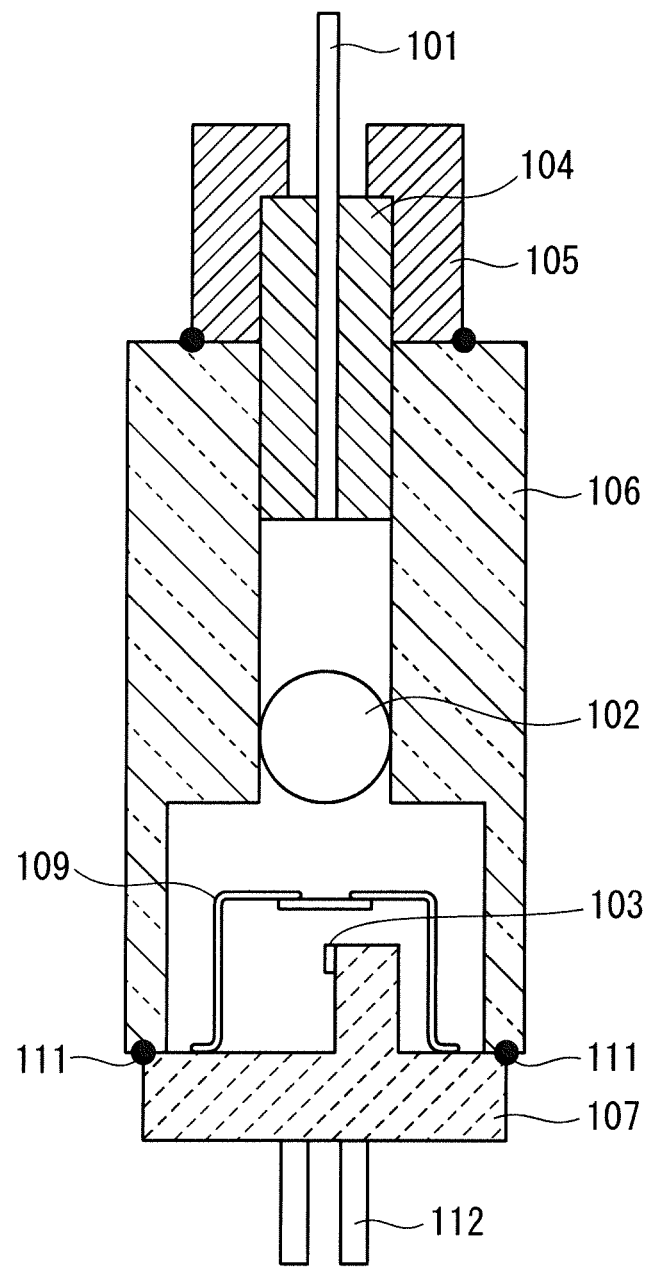
FIG. 14 is a cross-sectional view of a light source device according to a technique which is a premise of the present invention.

Next, advantageous effects of the light source device according to the first preferred embodiment are described in comparison with the light source device which is a technique being the premise of the present invention. Firstly, the light source device according to the technique which is the premise of the present invention is simply described by reference to FIG. 14. FIG. 14 is a cross-sectional view of the light source device according to the technique which is the premise of the present invention.

The light source device according to the technique which is the premise of the present invention includes; a stem 107; an LD 103; a cap 109; a light converging lens 102; an optical fiber 101; a ferrule 104; a ferrule holder 105; and a holder 106. The holder 106 holds the light converging lens 102 and the ferrule holder 105 to which the optical fiber 101 is connected. With respect to the holder 106, after the position adjustment is performed in a state where the holder 106 is brought into close contact with a stem 107 to which the LD 103 and a cap 109 are fixed, the holder 106 and the stem 107 are fixed by soldering or the like. Accordingly, a space for adjustment is required between the holder 106 and the cap 109 so that there has been a drawback that the structure of the holder 106 becomes complicated and the light source device becomes large-sized.

Further, it is necessary to fix the holder 106 and the stem 107 to each other by soldering or the like at fixing portions 111 in a state where the holder 106 and the stem 107 are adjusted with high accuracy. Accordingly, there exist the following drawbacks. That is, when constitutional members are heated and cooled at the time of fixing them by soldering, the constitutional members are thermally expanded and shrunken and a tension is generated in a soldered portion. Due to such thermal expansion or shrinkage of the constitutional members or the tension in the soldered portion, after fixing by soldering, the stem 107 is displaced in position from an optimum position by an order of micron thus giving rise to a drawback that a bonding efficiency is lowered exceeding an allowable level. Further, the conventional light source also has a drawback that the position adjustment operation of the holder 106 with respect to the stem 107 is difficult.

To the contrary, in the light source device according to the first preferred embodiment, the optical fiber connection portion 16 includes the position adjusting portion 20 for adjusting the position of the optical fiber connection portion 16 with respect to the holder 7. Accordingly, the space for adjustment is unnecessary between the holder 7 and the cap 6 so that the structure of the holder 7 is simplified and, eventually, the light source device can be miniaturized.

Further, the position of the optical fiber connection portion 16 with respect to the holder 7 can be adjusted using the position adjusting portion 20 and hence, the adjustment operation for converging light flux emitted from the LD 3 on the optical fiber 1 can be easily performed.

The optical fiber connection portion 16 includes a receptacle 4 which is screw-fixed to the holder 7 and to which the optical fiber 1 is connected. The position adjusting portion 20 is configured such that screws 9 for the screw-fixing are loosely fitted in the receptacle 4 with a play. Accordingly, the receptacle 4 can be easily fixed to the holder 7 after performing the position adjustment of the receptacle 4. Further, the position adjusting portion 20 can be realized with the simple constitution.

The light converging lens 2 is arranged in the inside of the cap 6. To be more specific, the light converging lens 2 is bonded to the block 10 and hence, unlike the technique which is a premise of the present invention, it is no more necessary to impart a function as a lens holder for holding a light converging lens to the holder 7 whereby the light source device can be miniaturized and a manufacturing cost can be reduced.

The LD 3 is a multi-emitter laser diode so that the light converging lens 2 converges light flux emitted from the LD 3 on one point and hence, it is possible to increase a light output of the LD 3 having a plurality of light emitting points.

The cap 6 is formed into a cylindrical shape, and the holder 7 is bonded to a side surface portion of the cap 6. To be more specific, the adhesive agents 8a, 8b for bonding the holder 7 to the cap 6 are arranged at positions which are in line symmetry with respect to the center of the optical axis 13 of light flux emitted from the LD 3 and hence, the holder 7 can be fixed to the cap 6 in a stable manner.

The adhesive agents 8a, 8b are respectively arranged in the lateral direction and the longitudinal direction of the light spot 15 which is converged by the light converging lens 2, and the adhesive agent 8a arranged in the longitudinal direction of the light spot 15 has larger Young's modulus after curing than the adhesive agent 8b arranged in the lateral direction of the light spot 15.

Accordingly, the positional displacement of the holder 7 due to the adhesive agent 8a hardly occurs and hence, the positional displacement of the light spot 15 on the optical fiber 1 becomes small whereby it is possible to realize a highly reliable light source device. Further, the adhesive agent 8b has smaller Young's modulus after curing than the adhesive agent 8a so that the adhesive agent 8b has a higher flexibility than the adhesive agent 8a. Accordingly, even when a heat cycle or the like is applied to the adhesive agent 8b, the adhesive agent 8b hardly ruptures and hence, high adhesive strength can be acquired. As a result, the durability of the light source device can be enhanced.

<Second Preferred Embodiment>

Figure 6:
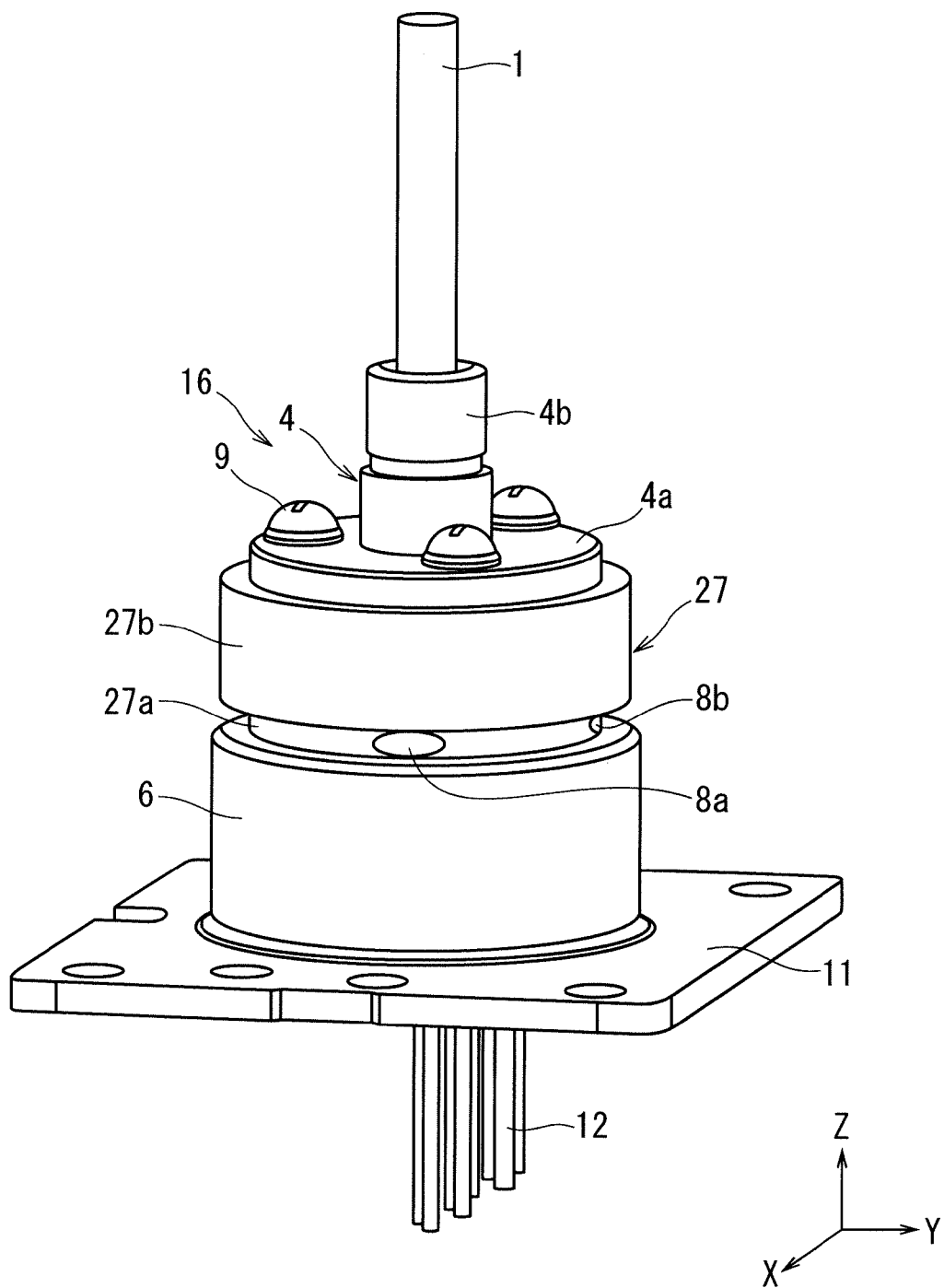
FIG. 6 is a perspective view of a light source device according to a second preferred embodiment.
Figure 7:
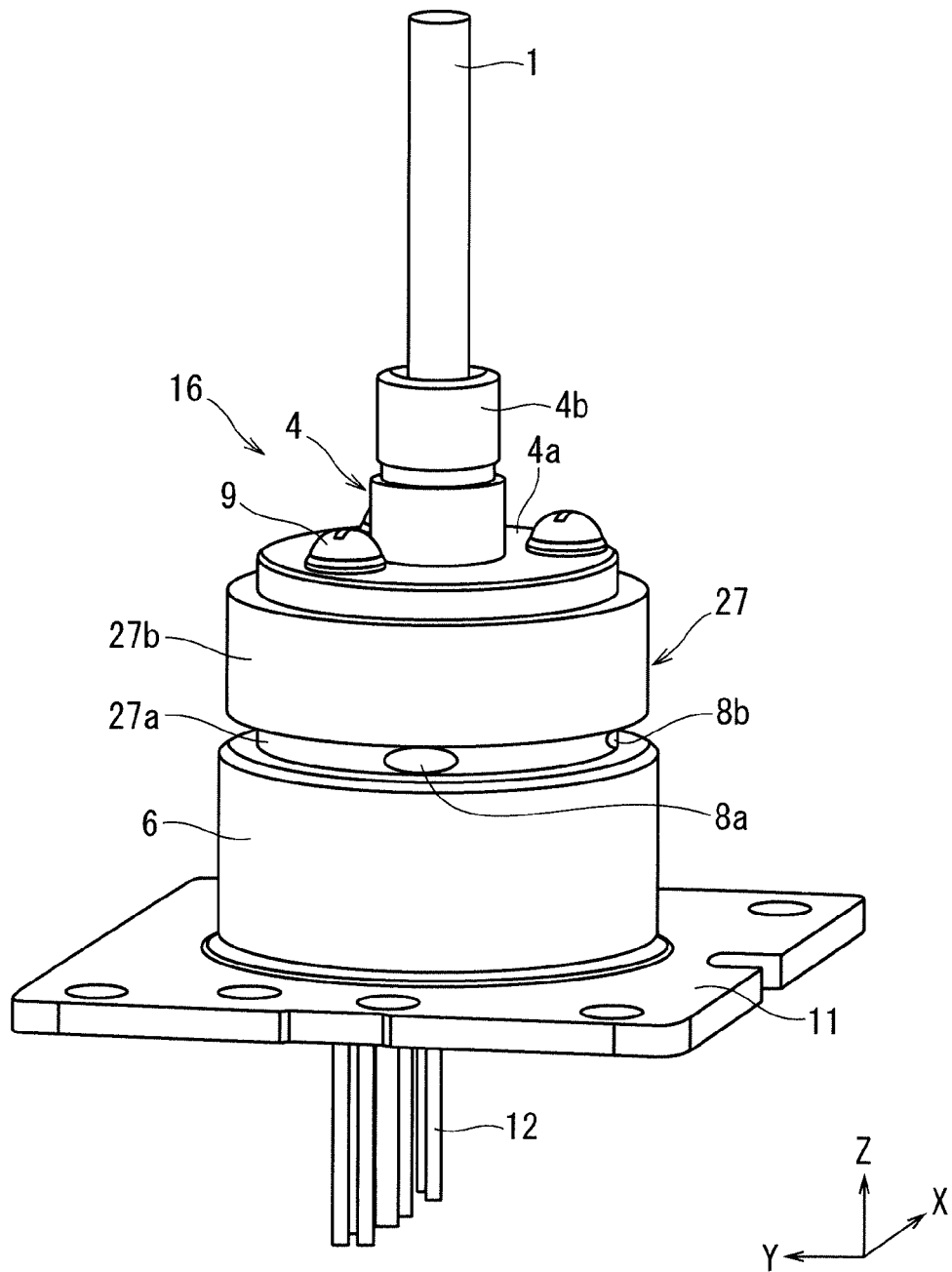
FIG. 7 is a perspective view of the light source device according to the second preferred embodiment as viewed from a different direction.
Figure 8:
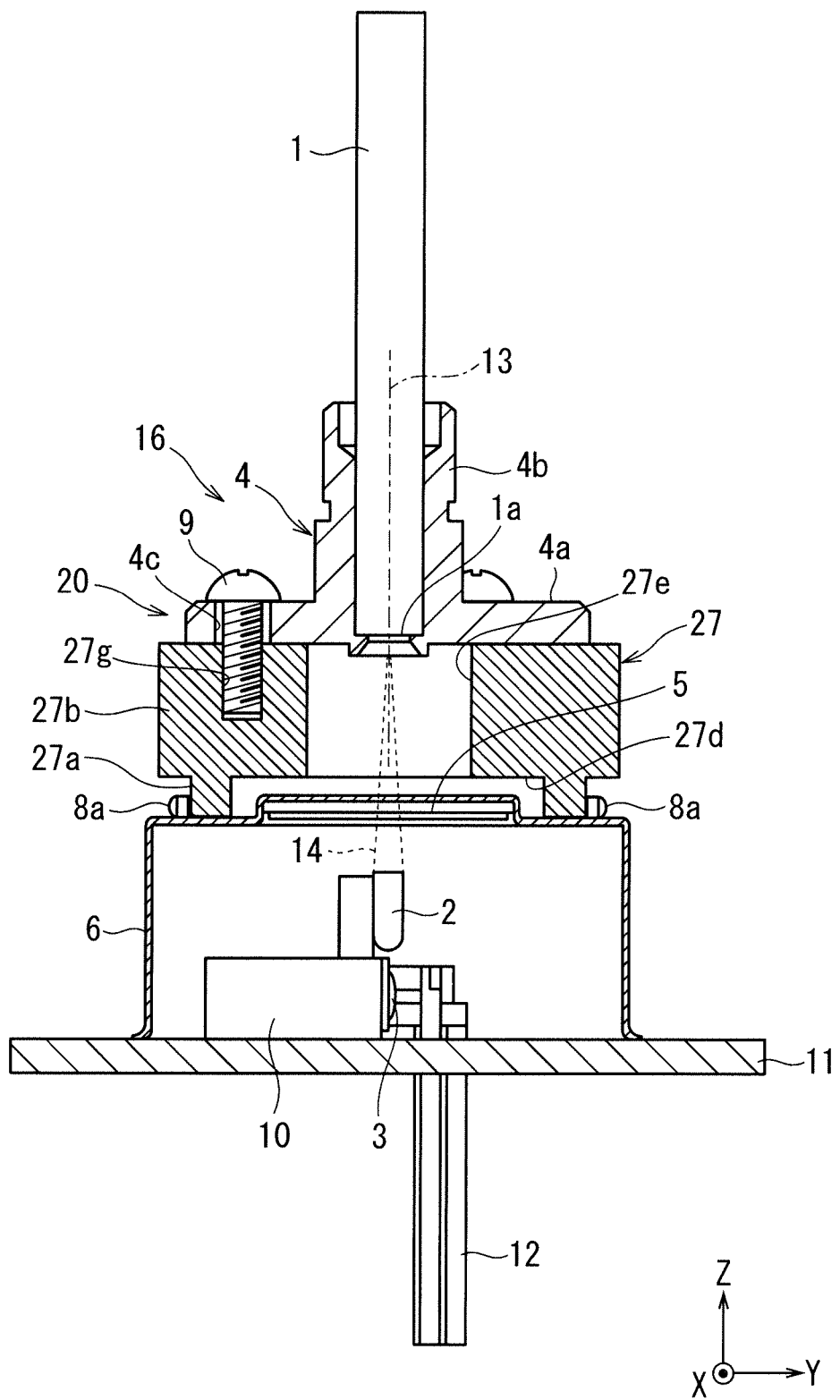
FIG. 8 is a Y-Z cross-sectional view in FIG. 6.
Figure 9:
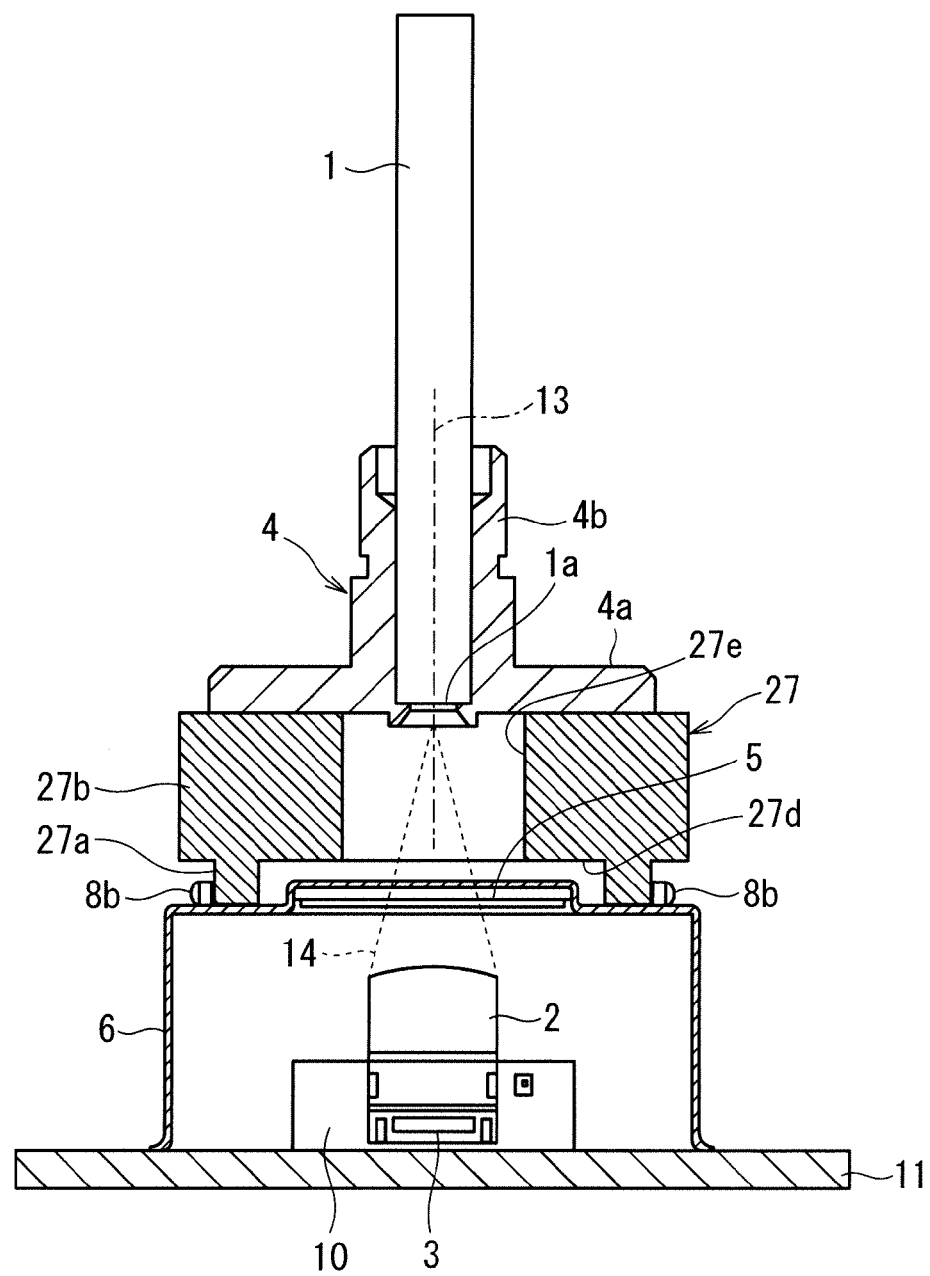
FIG. 9 is an X-Z cross-sectional view in FIG. 6.

Next, a light source device according to a second preferred embodiment is described. FIG. 6 is a perspective view of the light source device according to the second preferred embodiment, FIG. 7 is a perspective view of the light source device according to the second preferred embodiment as viewed from a different direction, FIG. 8 is a Y-Z cross-sectional view in FIG. 6, and FIG. 9 is an X-Z cross-sectional view in FIG. 6. In the second preferred embodiment, constitutional elements identical with the corresponding constitutional elements described in the first preferred embodiment are given the same symbols, and the repeated explanation of these constitutional elements is omitted.

The second preferred embodiment differs from the first preferred embodiment with respect to the structure of a holder. As shown in FIG. 6 to FIG. 9, the light source device includes a holder 27 in place of the holder 7 (see FIG. 1). The holder 27 is formed in a cylindrical shape, and includes a small-diameter cylindrical portion 27a and a large-diameter cylindrical portion 27b arranged on an upper side of the small-diameter cylindrical portion 27a. A lower end of the small-diameter cylindrical portion 27a is bonded to an upper surface portion of a cap 6. To be more specific, the holder 27 and the cap 6 are bonded to each other by applying adhesive agents 8a, 8b to a lower end portion of the small-diameter cylindrical portion 27a by coating. The positional relationship of the adhesive agents 8a, 8b in the small-diameter cylindrical portion 27a is substantially equal to the positional relationship of the adhesive agents 8a, 8b in the first preferred embodiment.

A plurality of (three, for example) screw holes 27g to which screws 9 are fixed are formed in an outer peripheral portion of the large-diameter cylindrical portion 27b. A housing portion 27d in which a glass window 5 is housed is formed in an inner portion of the small-diameter cylindrical portion 27a. A hole portion 27e which communicates with the housing portion 27d is formed at a center portion of the large-diameter cylindrical portion 27b.

As has been explained above, in the light source device according to the second preferred embodiment, the cap 6 is formed into a cylindrical shape, and the holder 27 is bonded to the upper surface portion of the cap 6 and hence, compared to the light source device according to the first preferred embodiment, the holder 27 is miniaturized and the structure is simplified. Eventually, the light source device can be miniaturized.

<Third Preferred Embodiment>

Figure 10:
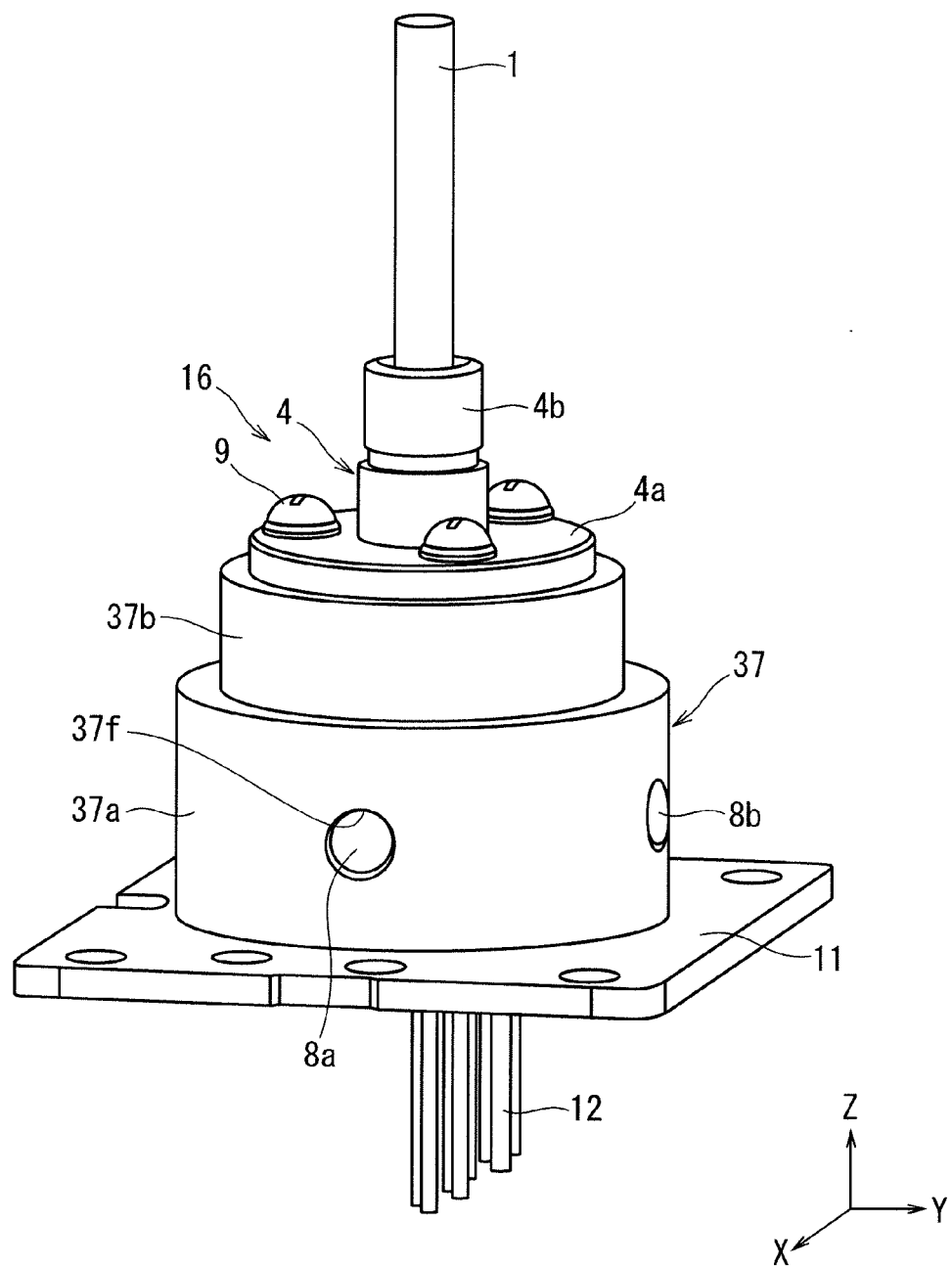
FIG. 10 is a perspective view of a light source device according to a third preferred embodiment.
Figure 11:
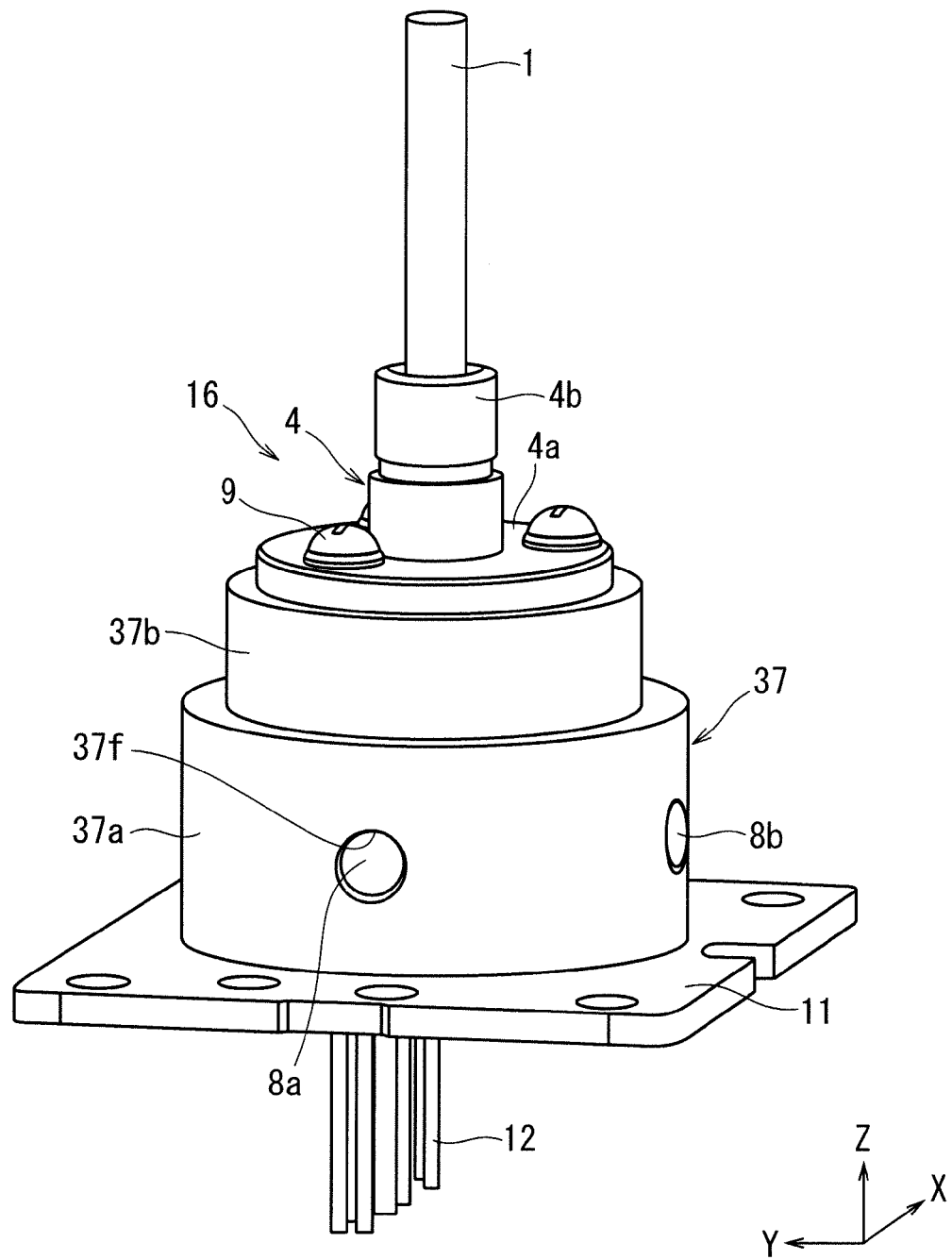
FIG. 11 is a perspective view of the light source device according to the third preferred embodiment as viewed from a different direction.
Figure 12:
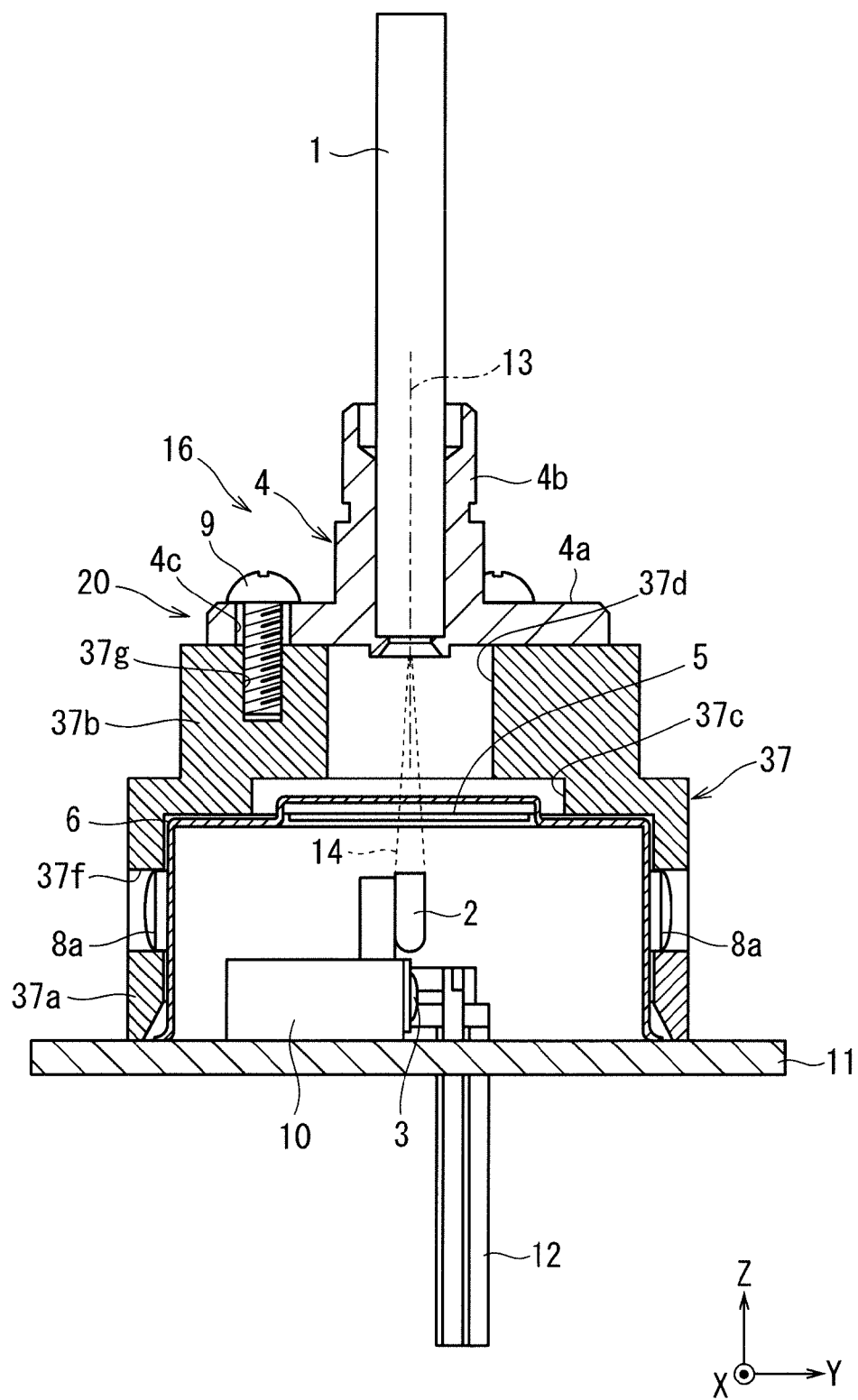
FIG. 12 is a Y-Z cross-sectional view in FIG. 10.

Next, a light source device according to a third preferred embodiment is described. FIG. 10 is a perspective view of the light source device according to the third preferred embodiment, FIG. 11 is a perspective view of the light source device according to the third preferred embodiment as viewed from a different direction, FIG. 12 is a Y-Z cross-sectional view in FIG. 10, and FIG. 13 is an X-Z cross-sectional view in FIG. 10. In the third preferred embodiment, constitutional elements identical with the corresponding constitutional elements described in the first and second preferred embodiments are given the same symbols, and the repeated explanation of these constitutional elements is omitted.

The third preferred embodiment differs from the first and second preferred embodiments with respect to the structure of a holder. As shown in FIG. 10 to FIG. 13, the light source device includes a holder 37 in place of the holder 7 (see FIG. 1). The holder 37 includes a large-diameter cylindrical portion 37a and a small-diameter cylindrical portion 37b arranged on an upper side of the large-diameter cylindrical portion 37a. A housing portion 37c is formed in an inner portion of the large-diameter cylindrical portion 37a. The housing portion 37c is configured so as to house a cap 6, and a lower end of the large-diameter cylindrical portion 37a is in contact with an upper surface of the stem 11 in a state where the holder 37 is fixed to the cap 6.

A hole portion 37d which communicates with the housing portion 37c is formed at a center portion of the small-diameter cylindrical portion 37b. A plurality of (four, for example) window portions 37f to which adhesive agents 8a, 8b are applied are formed on a side surface portion of the large-diameter cylindrical portion 37a. A plurality of (three, for example) screw holes 37g to which the screws 9 are fixed are formed in an outer peripheral portion of the small-diameter cylindrical portion 37b. In this preferred embodiment, in the same manner as the cut-away portions 7f in the first preferred embodiment, the window portions 37f are formed at positions which are in line symmetry with respect to the center of the optical axis 13 of light flux emitted from the LD 3. Further, the positional relationship of the adhesive agents 8a, 8b in the large-diameter cylindrical portion 37a is substantially equal to the positional relationship of the adhesive agents 8a, 8b of the first preferred embodiment.

In the light source device according to the third preferred embodiment, the positioning of the holder 37 in the height direction is performed by bringing a lower end of the large-diameter cylindrical portion 37a of the holder 37 into contact with the upper surface of the stem 11. Further, the large-diameter cylindrical portion 37a is bonded to the side surface portion of the cap 6 by applying the adhesive agents 8a, 8b to the window portions 37f of the large-diameter cylindrical portion 37a. Accordingly, the LD 3 and the optical fiber 1 are positioned with higher accuracy and hence, the positional displacement of the light spot 15 when a fixing portion is displaced can be decreased.

While the invention has been shown and described in detail, the foregoing description is in all aspects illustrative and not restrictive. It is therefore understood that numerous modifications and variations can be devised without departing from the scope of the invention.

What is claimed is:

1. A light source device comprising:
an optical semiconductor element which is mounted on a support base;
a cap which is fixed to said support base so as to cover said optical semiconductor element;
a light converging portion which converges light flux emitted from said optical semiconductor element;
an optical fiber connection portion to which an optical fiber is connected, the optical fiber receiving inputting of the light flux converged by said light converging portion; and
a holder which holds said optical fiber connection portion, the holder being fixed to said cap, wherein
said optical fiber connection portion includes a position adjusting portion which adjusts a position of said optical fiber connection portion with respect to said holder;
said cap is formed into a cylindrical shape;
said holder is bonded to a side surface portion of said cap; and
adhesive agents for bonding said holder to said cap are arranged at positions which are in line symmetry with respect to an optical axis of the light flux emitted from said optical semiconductor element.

2. The light source device according to claim 1, wherein
said optical fiber connection portion includes a receptacle which is screw-fixed to said holder and to which said optical fiber is connected, and
said position adjusting portion is configured such that a screw for said screw-fixing is fitted in said receptacle with a play.

3. The light source device according to claim 1, wherein
said light converging portion is arranged in the inside of said cap.

4. The light source device according to claim 1, wherein
said optical semiconductor element is a multi-emitter type optical semiconductor element, and
said light converging portion converges the light flux emitted from said optical semiconductor element on one point.

5. The light source device according to claim 1, wherein
said adhesive agents are arranged in a lateral direction and a longitudinal direction of a light spot converged by said light converging portion respectively, and
said adhesive agent arranged in the longitudinal direction of said light spot has larger Young's modulus after curing than said adhesive agent arranged in the lateral direction of said light spot.

6. A light source device comprising:
an optical semiconductor element which is mounted on a support base;
a cap which is fixed to said support base so as to cover said optical semiconductor element;
a light converging portion which converges light flux emitted from said optical semiconductor element;

an optical fiber connection portion to which an optical fiber is connected, the optical fiber receiving inputting of the light flux converged by said light converging portion; and a holder which holds said optical fiber connection portion, the holder being fixed to said cap, wherein said optical fiber connection portion includes a position adjusting portion which adjusts a position of said optical fiber connection portion with respect to said holder; wherein said cap is formed into a cylindrical shape, said holder is bonded to an upper surface portion of said cap; and adhesive agents for bonding said holder to said cap are arranged at positions which are in line symmetry with respect to an optical axis of the light flux emitted from said optical semiconductor element.

7. The light source device according to claim 6, wherein said adhesive agents are arranged in the lateral direction and the longitudinal direction of a light spot converged by said light converging portion respectively, and said adhesive agent arranged in the longitudinal direction of said light spot has larger Young's modulus after curing than said adhesive agent arranged in the lateral direction of said light spot.

* * * * *